United States Patent Office 3,435,964
Patented Apr. 1, 1969

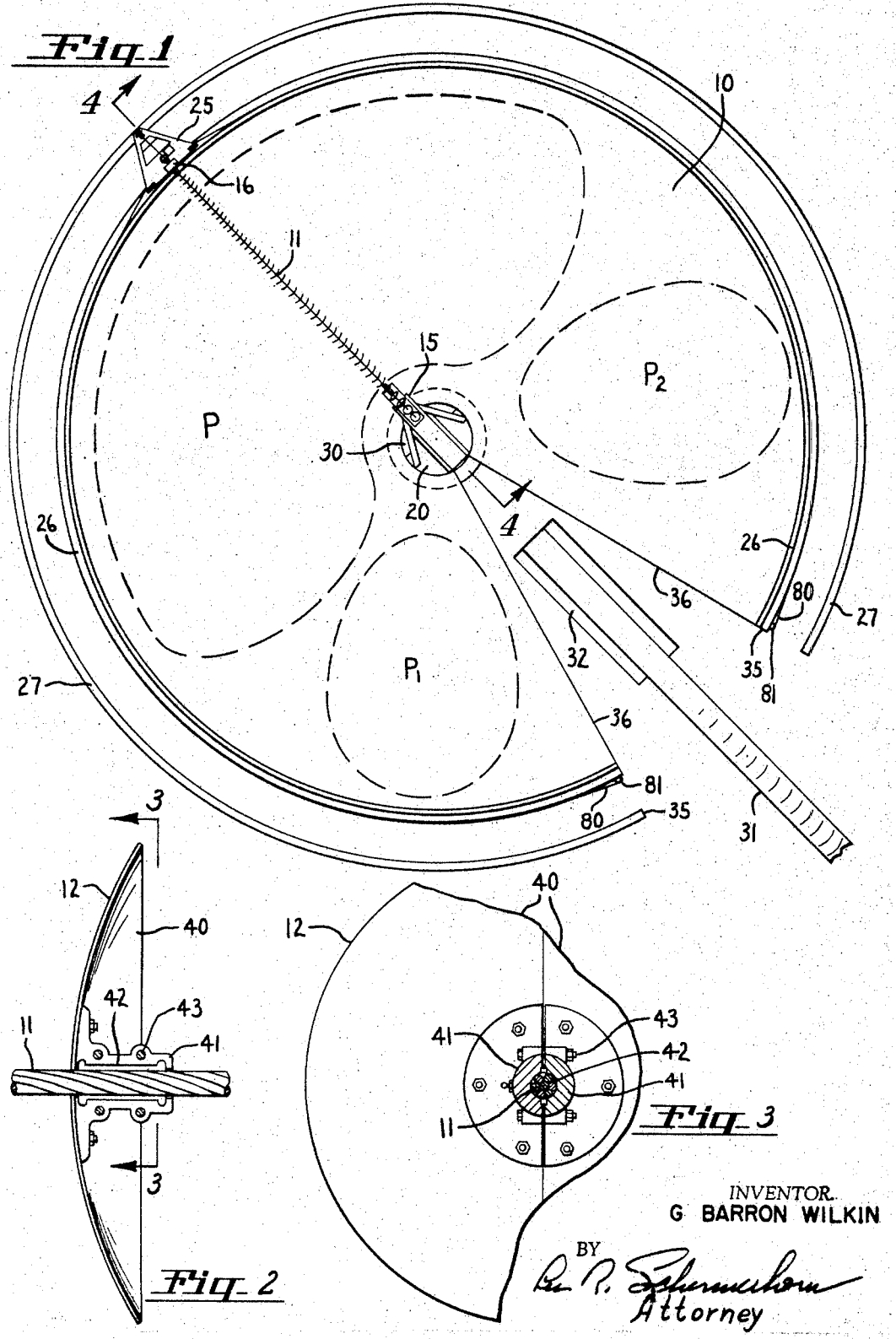

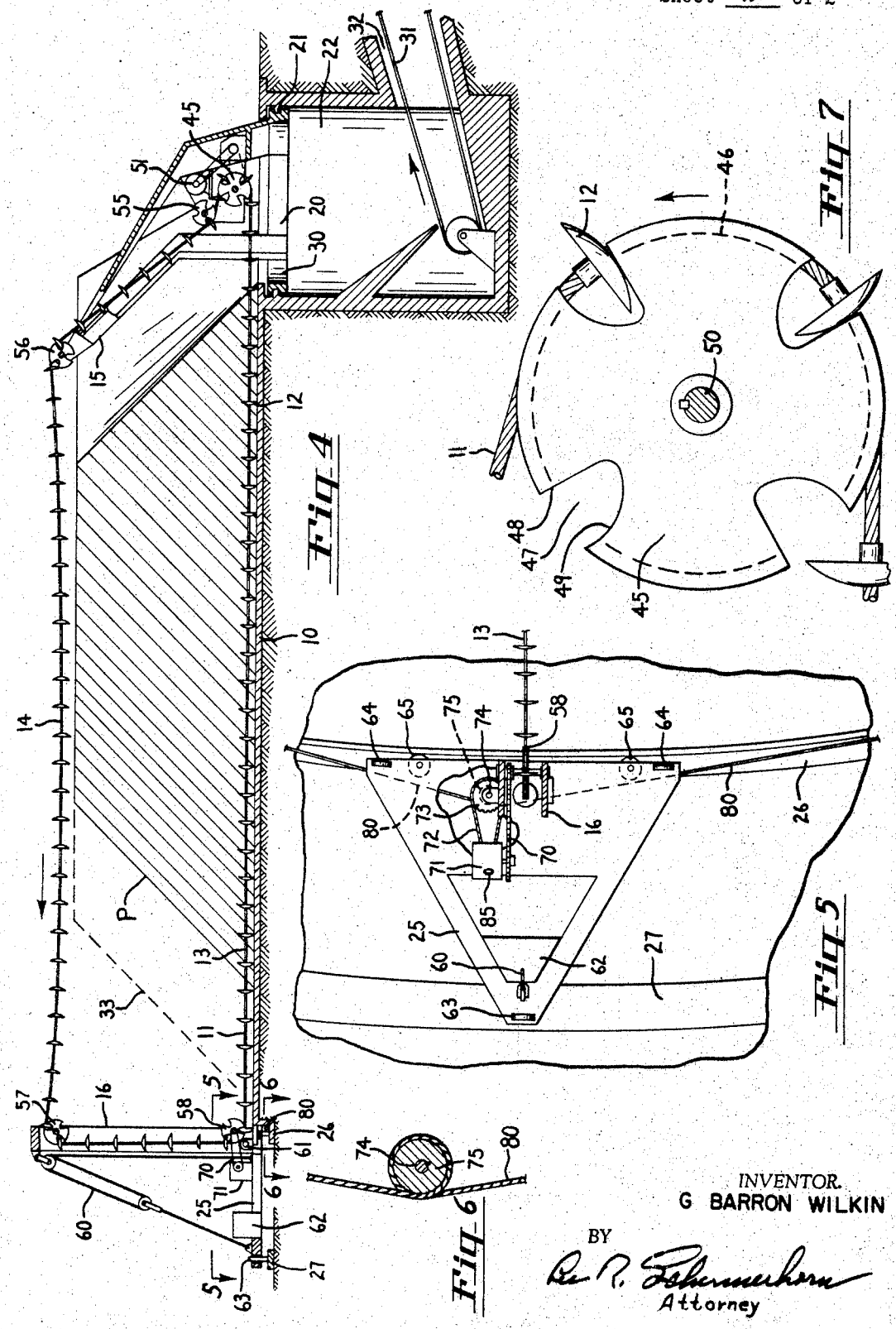

3,435,964
RECLAIMING CONVEYOR
G Barron Wilkin, 8235 N. Kirby Ave.,
Portland, Oreg. 97217
Filed Dec. 26, 1967, Ser. No. 693,269
Int. Cl. B55g 57/12; B65g 65/34
U.S. Cl. 214—10                                15 Claims

ABSTRACT OF THE DISCLOSURE

An endless cable having conveyor flights thereon, the cable having a lower horizontal reach on the level of the bottom of a pile of material to be removed and having an upper horizontal return reach above the top of the pile. One end of the conveyor run is pivotally mounted to swing in a vertical axis and the other end is supported by a carriage on an arcuate track causing the lower reach to cut laterally through the bottom of the pile in the manner of a bandsaw, removing material from the bottom.

Background of the invention

This invention relates to a digging type of conveyor for removing material from a pile.

It is often desired to remove material from a storage pile on a first-in, first-out basis. This is difficult to do where the pile is being replenished continuously or from time to time at the top because the material to be removed must then be taken from the bottom of the pile. Conventional hopper bottom conveyors are not suitable for large outdoor storage piles of material which tends to pack tightly together in a solid mass, such as wood chips or sawdust. Previous attempts to provide a bottom feeding conveyor for large piles of material have not been successful.

Brief summary of the invention

The present conveyor comprises an endless cable having conveyor flights attached thereto. A lower horizontal reach of the cable spans the width of the base of the pile at the level of the bottom of the pile while a return reach passes above the pile between two towers. One tower is mounted on a vertical pivot and the other tower is mounted on a carriage running on an arcuate track around the pivot. Movement of the carriage causes the lower reach of the conveyor to cut horizontally through the bottom of the pile in the manner of a bandsaw so that all removed material comes from the bottom of the pile.

This conveyor system does not interfere with the addition of new material to the top of the pile whereby discharge and replenishment may take place simultaneously, the material which has been longest in storage being at the bottom of the pile and the most recently added material being at the top. The conveyor may operate selectively on several such piles of material disposed within the arcuate sweep of the conveyor run.

Objects of the invention are to provide an improved reclaiming conveyor, to provide a reclaiming conveyor which will remove material from storage on a first-in, first-out basis, to provide a novel and improved conveyor system for removing material from the bottom of a large pile, to provide a conveyor system of the type described which will serve a plurality of adjacent piles of material, to provide a conveyor which will cut laterally through the bottom of a pile of material in the manner of a bandsaw and to provide a reclaiming conveyor which is less expensive to install and operate than conventional machinery for this purpose.

The foregoing and other objects and advantages will become apparent and the invention will be better understood from the following detailed description of the preferred embodiment illustrated in the accompanying drawings. Various changes may be made in the details of construction and arrangement of parts and certain features may be used without others. All such modifications within the scope of the appended claims are included in the invention.

Brief description of the drawings

FIGURE 1 is a top plan view of a reclaiming conveyor embodying the features of the invention;

FIGURE 2 is an enlarged sectional view showing a conveyor flight on the endless cable;

FIGURE 3 is a fragmentary view on the line 3—3 of FIGURE 2;

FIGURE 4 is a view on the line 4—4 in FIGURE 1;

FIGURE 5 is an enlarged fragmentary view on the line 5—5 in FIGURE 4;

FIGURE 6 is an enlarged fragmentary view on the line 6—6 in FIGURE 4; and

FIGURE 7 is an enlarged view of the drive sprocket in FIGURE 4.

Description of the preferred embodiment

Referring first to FIGURE 4, the numeral 10 indicates a flat horizontal support for a storage pile of material P. An endless steel cable 11 has conveyor flights 12 attached thereto. The run of the conveyor has a lower horizontal reach 13 on the level of the bottom of the pile and an upper horizontal return reach 14 passing over the top of the pile. These conveyor reaches extend between two towers 15 and 16.

Tower 15 is mounted on a turntable 20 which is supported for rotation on a circular track 21 in a pit 22. Tower 16 is mounted on a carriage 25 arranged to run on arcuate tracks 26 and 27 concentric with the axis or turntable 20. Carriage 25 is driven in opposite directions on the tracks 26 and 27 to cause the lower reach 13 of the conveyor to cut horizontally through the bottom of the pile P first in one direction then the other for removing material from the bottom of the pile. Conveyor cable 11 travels in the direction of the arrows to discharge material through an opening 30 in turntable 20, the material then being removed by an endless belt or other suitable type of discharge conveyor 31 in the pit 22.

At the same time, material may be added to the top of the pile by any suitable conventional means without interfering with the operation of conveyor 11. Upper reach 14 of conveyor 11 levels off the top of the pile by moving excess material to the left in FIGURE 4. Thus, if material is temporarily being added faster than it is removed, the upper conveyor reach 14 will extend the left side of the pile out to the broken line 33. Then, during intervals when material is being removed from the bottom of the pile faster than it is being added at the top, the top of the pile will gradually recede downward away from the upper reach 14.

The lower, receiving end of conveyor 31 may enter the pit 22 through a sloping tunnel 32 and its discharge end may be located at or above ground level at a distance from the pit as shown in FIGURE 1. Arcuate tracks 26 and 27 are preferably not complete circles but end at points 35 on opposite sides of the conveyor 31. Likewise, the supporting floor 10 is preferably not continuous around the pit 22 but terminates at lines 36 on opposite sides of conveyor 31 and tunnel 32. Three piles P, $P_1$ and $P_2$ are shown in FIGURE 1 by way of example but the material may be placed in one continuous arcuate pile or divided into any number of separate piles as desired.

Conveyor flights 12 may be of any desired size and shape. Curved circular discs are shown in FIGURES 2 and 3 by way of example. The discs are preferably made in two identical halves 40 which are connected with two mating hub portions 41. These hub portions contain mating rubber bushing halves 42 which are clamped tightly on cable 11 by means of bolts 43. This arrangement allows the flights 12 to be accurately spaced apart on the cable to fit the pitch of the driving sprocket.

Drive sprocket 45 appears in FIGURES 4 and 7. The sprocket wheel is grooved at 46 to carry cable 11 and notched at 47 to receive the flights 12. Preferably, the notches have radial rear sides 48 to engage the rear sides of the flights 12 and curved cutaway portions 49 on the forward sides to clear the flights as the flights leave the sprocket wheel. With four notches 47, it will be apparent that two of the notches are always engaged with flights 12 to draw the lower reach of the cable forward. Rubber bushings 42 allow the engaged flights to move slightly on the cable and share the load of driving the cable.

Sprocket 45 is keyed to a drive shaft 50 which is driven by a motor 51 on turntable 20 at the base of tower 15. Sprocket 55 is a guide sprocket to maintain an approximately 180° wrap of the cable 11 about drive sprocket 45 so that the drive sprocket will always be in engagement with at least two of the flights 12 as described. An idler sprocket 56 at the top of tower 15 directs the upper reach 14 of the cable across the top of the pile toward another idler sprocket 57 at the top of tower 16. Sprocket 58 at the base of tower 16 guides the cable back to its lower reach 13.

Cable 11 is tightened to maintain the desired amount of sag in its upper reach 14 by a block and tackle type of cable backstay 60 for the tower 16. Tower 16 is pivotally mounted on carriage 25 by means of horizontal heel pins 61. Overturning of carriage 25 from cable tension in the upper reach 14 is prevented by a counterweight 62. Carriage 25 is triangular in plan view as shown in FIGURE 5, having a single vertical wheel 63 rolling on track 27. Track 26 is L-shaped in cross section having a horizontal portion and a vertical flange portion. A pair of vertical wheels 64 on carriage 25 roll on the horizontal portion of track 26 and a pair of horizontal wheels 65 roll on the vertical flange portion to sustain the horizontal tension in cable 11.

Carriage 25 is driven by cable 11. Sprocket 58 drives a chain 70 to a gear box transmission 71. Transmission 71 drives a chain 72 on a sprocket 73 on a vertical shaft 74. A capstan pulley 75 is keyed to shaft 74 as shown in FIGURE 6. A stationary traction cable 80 makes one or two loops around drive pulley 75. Traction cable 80 is disposed around the vertical flange of track 26 with its opposite ends anchored at two points 81 at the ends of the track as shown in FIGURE 1. Thus, the capstan pulley 75 moves the carriage 25 slowly around the tracks 26 and 27. The speed of the carriage may be adjusted by a variable ratio control lever 85 on the transmission 71.

Transmission 71 also contains suitable clutch and reversing gear means for driving carriage 25 in opposite directions. Adjustable cam lugs or other suitable devices (not shown) are provided on track 26 for reversing the transmission at predetermined stations on the track. The reversing points for carriage 25 are adjusted to points on opposite sides of the pile of material to be removed. Thus, the carriage is caused to run back and forth continuously and automatically to move the lower conveyor reach 13 back and forth under one of the piles shown in FIGURE 1 without disturbing the other piles. The arcuate length of such excursions may extend through a small angle or through the nearly 360° extent of track 26 according to the width of the pile to be removed.

Conveyor cable 11 is stopped only when it is beyond the edge of a pile and free of overlying material so that it will never have to be started in a buried condition. As long as conveyor cable 11 is moving around its sprocket wheels, its flights 12 will cut and maintain a tunnel for the flights in the pile of material regardless of the depth of the pile. The tightly packed and undisturbed material above the flights 12 in the lower reach establishes a temporary ceiling for the tunnel which does not fall down between the flights and stall the conveyor. The flights cut into and remove material only on the laterally advancing side of the lower reach as determined by the direction of travel of carriage 25.

The tunnel ceiling eventualy collapses some distance behind the retrograde side of the lower reach. This behavior of the packed material permits the lower reach to advance continuously laterally with carriage 25 in the manner of a bandsaw with the saw kerf continually closing at a distance behind the saw. The tunnel does not collapse in such a manner as to stall the conveyor. This is a unique and effective mode of operation for removing material from the bottom of the pile.

Bottom conveyors of great length in a fixed position are inoperative in a large pile because of the alternate arching and collapsing of the material over the conveyor. When the material arches, the conveyor is starved and does not feed. When the arch collapses, the conveyor is stalled and does not feed. The present conveyor utilizes both of these hitherto troublesome phenomena to advantage.

Having now described my invention and in what manner the same may be used, what I claim as new and desire to protect by Letters Patent is:

1. The method of removing material from a storage pile on a suporting surface comprising drawing an endless chain of conveyor flights lengthwise across said surface at one side of the pile, passing said chain of flights through the base of the pile in a lateral sweeping movement until the chain of flights emerges from the opposite side of the pile, said lateral sweeping movement being effected by swinging one end of the run of said endless chain of flights horizontally in an arc around the opposite end of the run as a pivot point and passing a return reach of said endless chain of fights across and leveling off the top of the pile.

2. The method of claim 1 including discharging material from said flights at said pivot point.

3. The method of claim 1 including the step of utilizing the lengthwise movement of said chain of flights to swing said one end of said run.

4. The method of claim 1 including the steps of sweeping said chain of flights back and forth through the pile in opposite lateral directions.

5. A reclaiming conveyor system for removing material from a pile on a supporting surface comprising a conveyor having an endless chain of conveyor flights with a working reach on said supporting surface, means for sweeping said working reach laterally about a vertical axis through the base of the pile from one side of the pile to its opposite side, and means for passing a return reach of the conveyor across and leveling off the top of the pile.

6. A conveyor system as defined in claim 5 including means driven by the conveyor for effecting said lateral sweeping movement.

7. A conveyor system as defined in claim 5 including towers at the opposite ends of said conveyor arranged to support said return reach in elevated position.

8. A conveyor system as defined in claim 5 including means for pivotally supporting one end of said conveyor, said lateral sweeping means being arranged to swing the opposite end of said conveyor in an arcuate path about said pivotal supporting means.

9. A conveyor system as defined in claim 8 including a carriage running on an arcuate track to support said opposite end of said conveyor.

10. A conveyor system as defined in claim 9 including means at said pivotally supported end of the conveyor for driving the conveyor, and means on said carriage driven by said conveyor for driving said carriage.

11. A conveyor system as defined in claim 10, said carriage driving means comprising a capstan pulley, and a traction cable wrapped around said pulley and secured at its ends to said track.

12. A conveyor system as defined in claim 9 wherein said means for pivotally supporting said one end of said conveyor is a turntable, and towers on said turntable and carriage arranged to support said return reach of the conveyor in elevated position.

13. A conveyor system as defined in claim 12 wherein said turntable is mounted for rotation in a pit and said conveyor discharges into said pit, and means for removing said conveyor discharge from said pit.

14. A conveyor system as defined in claim 5 wherein said conveyor comprises an endless cable having said flights clamped thereon, grooved driving and idler sprocket wheels supporting said cable, and notches in said sprocket wheels receiving said flights.

15. A reclaiming conveyor system comprising a pit, a turntable mounted for rotation in said pit, a conveyor drive sprocket on said turntable, a motor on said turntable for driving said sprocket, a tower on said turntable, an idler sprocket in the top of said tower, an arcuate track concentric with said turntable, a carriage on said track, a sprocket on said carriage, a tower on said carriage, a sprocket in the top of said tower, an endless chain of conveyor flights trained around said sprockets having a lower reach between said carriage and turntable arranged to discharge into said pit and having an upper return reach extending between the tops of said towers, means for removing conveyor discharge from said pit, and means driven by said carriage sprocket for driving said carriage.

References Cited

UNITED STATES PATENTS

| | | | |
|---|---|---|---|
| 476,616 | 6/1892 | Dodge | 198—36 XR |
| 2,335,611 | 11/1943 | Pray | 198—168 XR |
| 2,701,653 | 2/1955 | Gilson. | |

GERALD M. FORLENZA, *Primary Examiner.*

FRANK E. WERNER, *Assistant Examiner.*

U.S. Cl. X.R.

198—125, 168; 214—17